United States Patent [19]

Stelts

[11] Patent Number: 5,610,346

[45] Date of Patent: Mar. 11, 1997

[54] APPARATUS FOR STORING AND DROPPING EXPENDABLE BOF SENSORS

[75] Inventor: Philip D. Stelts, Center Valley, Pa.

[73] Assignee: Bethlehem Steel Corporation, Bethlehem, Pa.

[21] Appl. No.: 583,574

[22] Filed: Jan. 5, 1996

[51] Int. Cl.$^6$ .................................................. G01K 13/00
[52] U.S. Cl. ........................ 73/866.5; 374/140; 266/271; 266/903; 266/100
[58] Field of Search ........................... 73/866.5; 374/139, 374/140, 208; 134/230–235; 266/271, 272, 903, 99, 100

[56] References Cited

U.S. PATENT DOCUMENTS

| | | |
|---|---|---|
| 3,250,125 | 5/1966 | Bonn . |
| 3,374,122 | 3/1968 | Cole ........................................ 136/234 |
| 3,390,578 | 7/1968 | Moore . |
| 3,396,580 | 8/1968 | Cole . |
| 3,463,005 | 8/1969 | Hance . |
| 3,561,743 | 2/1971 | Schroeder ................................ 266/80 |
| 3,574,598 | 4/1971 | Kern et al. ................................ 75/60 |
| 3,597,975 | 8/1971 | Ketts et al. ............................... 73/293 |
| 3,673,869 | 7/1972 | Stawarski et al. . |
| 4,749,254 | 6/1988 | Seaver ................................. 73/866.5 X |
| 5,275,488 | 1/1994 | Stelts ........................................ 374/140 |

Primary Examiner—Thomas P. Noland
Attorney, Agent, or Firm—Harold I. Masteller, Jr.

[57] ABSTRACT

A sensor dropper for storing, shielding and dropping sensors into a BOF vessel. The sensor dropper includes a support frame to move the stored sensors toward or away from a sensor drop path leading into said BOF vessel, a dropper assembly supported on the support frame for storing and releasing sensors into the sensor drop path to the BOF, and a shield gate to protect the sensor dropper and stored sensors from BOF fume. The dropper assembly includes a plurality of storage and release mechanisms and corresponding shear mechanisms. Each storage and release mechanism includes a threaded sensor support shaft from which a stored sensor is suspended and dropped into the sensor drop path when the threads of the sensor support shaft are rotated in an outward direction, and each shear mechanism includes a shear blade housed within a tubular cutter having outer shear blades to sever an electrical sensor cable when the inner shear blade is rotated past the outer shear blades. The shield gate is rotatably mounted at a location along the sensor drop path between the dropper assembly and includes a counterweight to hold shield gate in a closed position. The counterweight is balanced to allow the shield gate to rotate to an open position upon impact from a dropped sensor and return to the closed position after the dropped sensor falls from the shield gate into the BOF vessel.

24 Claims, 10 Drawing Sheets

APPARATUS FOR STORING AND DROPPING EXPENDABLE BOF SENSORS

BACKGROUND OF THE INVENTION

This invention is directed to apparatus for dropping expendable thermocouples into a BOF (Basic Oxygen Furnace) vessel, and more particularly, to apparatus capable of both storing and dropping thermocouples into the BOF at different selected times, as well as shearing off remaining electrical cables left behind from any expended thermocouples.

Free falling weighted thermocouple sensors are important control devices used in the production of steel in a BOF vessel. These weighted sensors provide low cost, reliable measurement systems that penetrate the slag layer and probe the steel bath to a sufficient depth to provide accurate temperature measurements via a cable that extends between the dropped sensor and recording equipment located in a BOF control room.

Access to the molten steel bath within a BOF is limited because a hood covers the mouth of the vessel during steelmaking operations. Therefore, it has become the practice to drop weighted sensors through the weigh hopper that is used to deliver flux into the steel bath. Weigh hoppers are located above the mouth of a BOF vessel located high above the operating floor of the steelmaking shop, and they usually include a flux chute that extends downward toward the vessel mouth. This location and physical arrangement makes weigh hoppers suitable for delivering the weighted sensors into the BOF. In the past, a steelworker was either stationed at the weigh hopper to toss sensors into the vessel whenever a temperature measurement was needed, or alternatively, he made repeated trips from the operating floor to the weigh hopper each time a sensor was dropped. In either event, such manual procedures are highly inefficient and a waste of manpower.

As a result, various past attempts have been made to provide automatic or semi-automatic storage and release mechanisms for delivering sensors into a BOF vessel. However, many of the past dropper devices worked poorly at best because the environment above the mouth of a BOF steelmaking vessel is extremely hostile to electro/mechanical equipment. For example, the ambient temperature above a BOF vessel is high enough to cause electrical equipment to fail. In addition, the fume and dirt emitted from the steelmaking vessel settles on any equipment brought into the area, and mechanisms such as air cylinders do not work well in this environment. Also, a fine graphite powder rich in carbon, called kish, falls as part of the fume and causes short circuiting in any exposed electrical connections.

Flames that erupt form the mouth of the vessel during oxygen blow operation can cause further problems for sensor equipment located above the BOF. It is common practice to drop sensors down the flux chute that extends toward the mouth of the BOF. The explosive flames can travel upward along structures such as the flux chute and cause damage to the sensor equipment positioned above.

And finally, a more recent problem that was discovered when automatic droppers were brought into use is the need to clear the sensor drop path of remaining electrical cables that are left behind from prior expended sensors that were dropped into the BOF. These remaining cables extend downward from the dropper apparatus, through the weigh hopper and along the flux chute, and dangle in a web like mass above the mouth of the vessel. The leftover cables create an obstacle to the free fall of following weighted sensors, and collisions with the dangling cables cause the sensors to enter the vessel erratically. This results in poor sensor penetration into the steel bath and unreliable temperature readings.

The various hostile conditions and problems that are described above have caused past sensor droppers to either fail or work poorly. One past sensor dropper is disclosed in U.S. Pat. No. 3,396,580 granted to Cole on Aug. 13, 1968. Cole discloses a dropper device comprising a plurality of spaced apart channel members for storing weighted thermocouples in a ready position above a BOF. In addition, Cole discloses a means to jettison remaining expended electrical cables before following sensors are dropped into the vessel. However, Cole uses air cylinders to position and release his sensors. We have found that the failure rate for air cylinders is quite high when they are exposed to the hostile environment found above the mouth of a BOF vessel. Knowing this, it then follows that the mechanics of the Cole dropper would most likely work poorly in this environment.

An even greater weakness of the Cole teaching is his need to drop two weighted devices into the BOF vessel each time a temperature measurement is taken. Cole shows a cone shaped secondary bomb attached to each temperature sensor that is dropped into the BOF. The cone shaped bomb supports the coiled electrical cable during the temperature probe, and following the temperature readings it is released and dropped into the vessel. As the secondary bomb falls from the dropper apparatus, it tears the expended "extension cord" free from its electrical connection and clears the drop path of expended cable before the next temperature sensor is dropped. As clearly shown in Cole's drawings, and as described in his specification, he uses alligator clips in order to provide a loose electrical connection that will insure the release of the extension cord. The ends of the extension cord are clamped in the alligator clips that extend from control panel wires.

Such connections are unreliable. They can generate a poor signal between the thermocouple and control panel, and they can be accidently disconnected during normal steelmaking operations, producing complete sensor failure.

SUMMARY OF THE INVENTION

It is therefore the object of this invention to provide improved sensor dropper for storing and dropping expendable BOF sensors.

It is still a further object of this invention to provide an improved sensor dropper having a mechanism suitable for use adjacent the mouth of a BOF vessel.

And finally, it is still a further object of this invention to provide an improved sensor dropper having a shear for clearing expended electrical cables from the sensor drop path.

I have discovered that the foregoing objects can be attained by having a sensor dropper for storing, shielding and dropping sensors into a BOF vessel. The sensor dropper includes a support frame to move the sensor dropper toward or away from a drop path leading into said BOF vessel, a dropper assembly supported on the support frame for storing and releasing sensors into the drop path to the BOF, and a shield gate to guide dropped sensors toward the drop path and protect the sensor dropper from the flames and fume that erupt from the mouth of the BOF vessel. The dropper assembly includes a plurality of storage and release mechanisms and corresponding shear mechanisms. Each storage and release mechanism includes a threaded sensor support shaft from which a stored sensor is suspended and dropped into the drop path when the threads of the sensor support shaft are rotated in an outward direction, and each shear mechanism includes a shear blade housed within a tubular cutter having outer shear blades to sever an electrical sensor cable when the inner shear blade is rotated past the outer shear blades.

DETAILED DESCRIPTION OF THE PREFERRED EMBODIMENT

Figure 1:
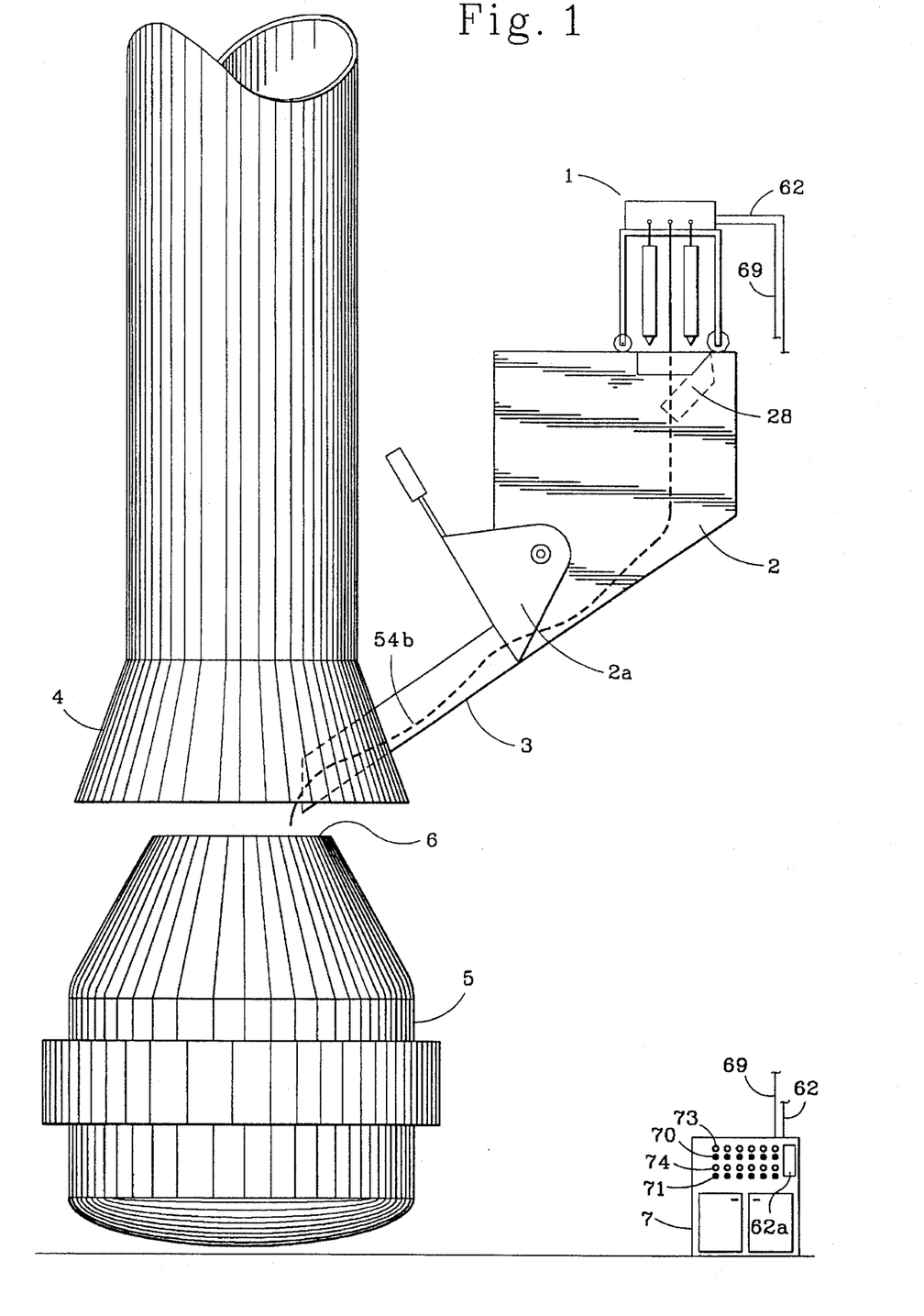
FIG. 1 is a schematic drawing showing the preferred sensor dropper system arrangement in a BOF steelmaking shop.

Referring to FIG. 1, the preferred system for dropping expendable sensors into a BOF vessel comprises a sensor dropper 1 positioned above a weigh hopper 2 coupled to a flux chute 3 that extends through the exhaust hood 4 of a BOF vessel 5 to provide a drop path into the mouth 6 of the BOF vessel, and a control panel 7 electrically connected to operate the sensor dropper 1. The weigh hopper and flux chute are ordinarily used to deliver flux and an assortment of alloying materials into a BOF vessel, and they provide an available and convenient sensor drop path into the BOF. The drop path extends downward through the weigh hopper 2 and weigh hopper gate 2a, along the flux chute 3 and into the mouth 6 of the BOF vessel positioned at a location below the sensor dropper 1.

The weigh hopper gate 2a is a common device used to open and close the flux chute passage way into the mouth of the BOF vessel, and it includes a control means that allows steelmakers to open and close the weigh hopper gate when they are dropping materials into the BOF. The weigh hopper gate 2a is placed in its open position during sensor drops.

Referring to FIGS. 2–7 of the drawings, the preferred embodiment of the sensor dropper 1 is shown positioned above the drop path that leads into the mouth of the BOF vessel. As more clearly shown in FIGS. 2 and 4, the weigh hopper 2 includes structural framework 8 that supports a guide way 9 for directing the sensor dropper toward or away from the drop path leading into the BOF vessel. The structural framework of the weigh hopper includes steel channels 10 and a longitudinal beam 11 that extends between two opposed steel channels 10. A shaped track 12 is fastened to the top flange of beam 11 to provide a guide for directing the sensor dropper 1 across the weigh hopper opening and over the drop path. Guide rail 12 includes spaced apart straps 13 that provide means to fasten the guide rail to beam 11 by welding or other suitable means. An angle member 14, attached to guide rail 12, is positioned parallel to the weigh hopper opening to provide a stop that prevents the sensor dropper 1 from being pushed into the weigh hopper.

Figure 3:
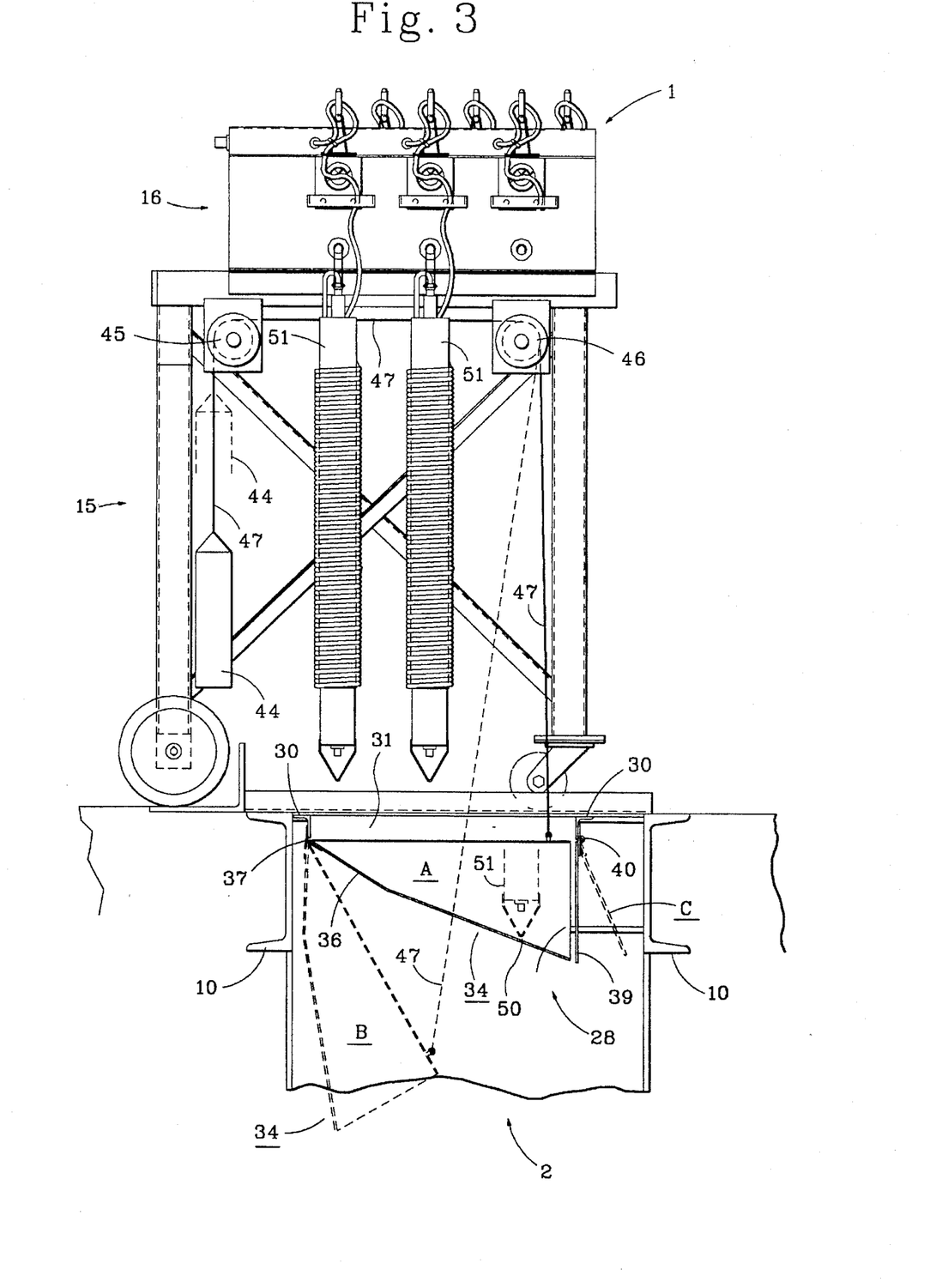
FIG. 3 is a fragmentary view similar to FIG. 2 showing a shield gate to protect the sensor dropper and stored sensors.
Figure 5:
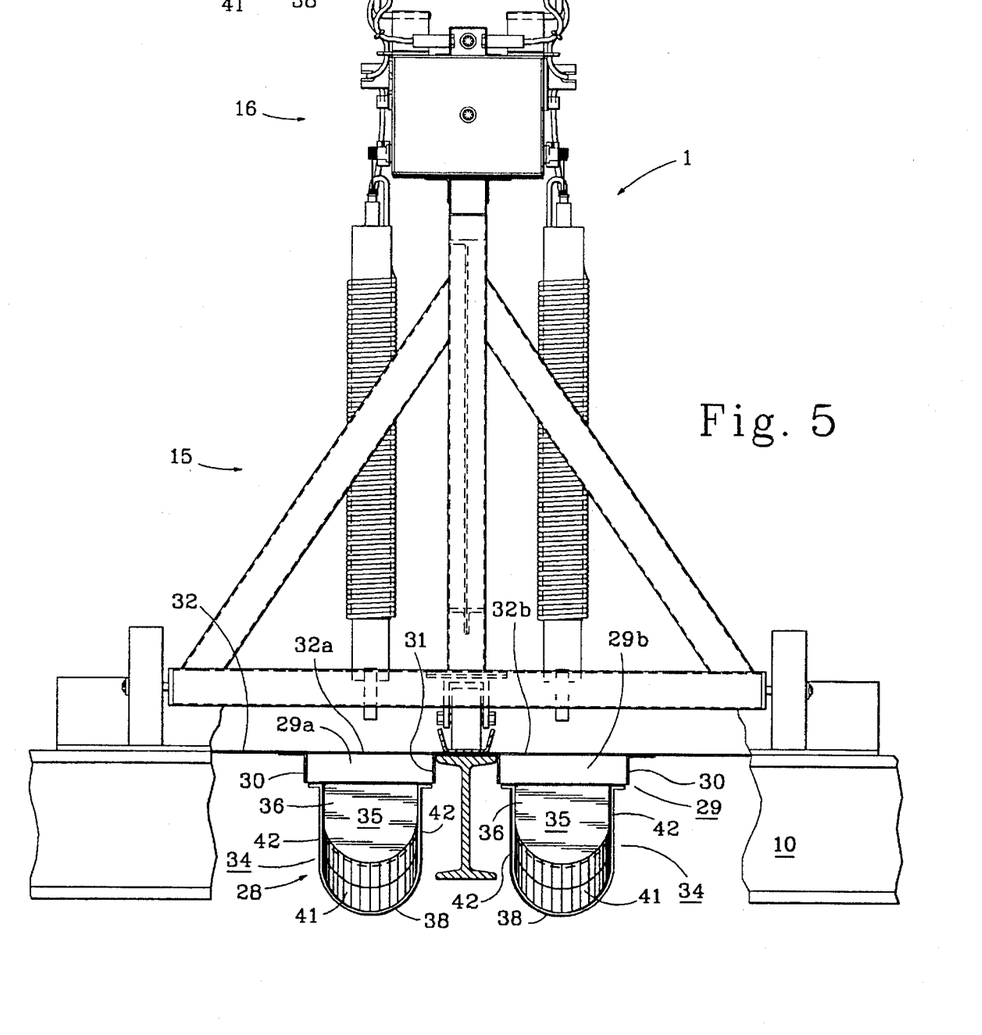
FIG. 5 is a fragmentary view similar to FIG. 4 showing shield gates to protect the sensor dropper and stored sensors.
Figure 6:
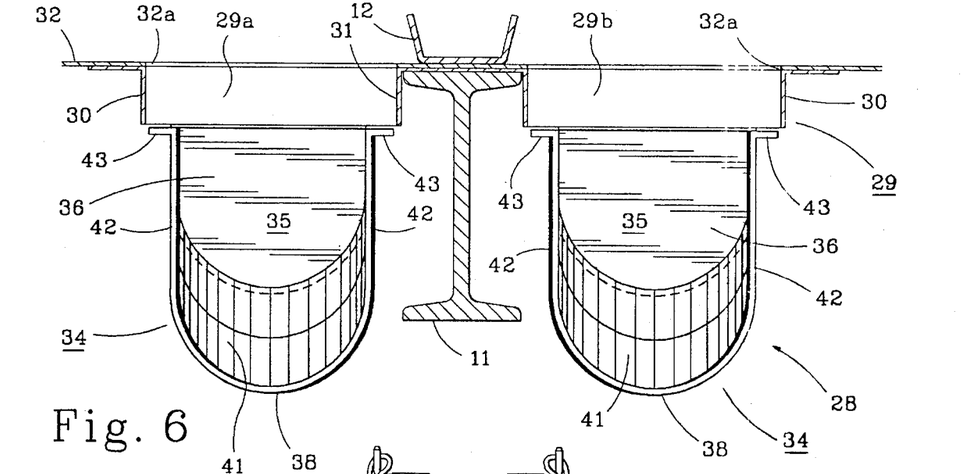
FIG. 6 is an enlarged view of the shield gates shown in FIG. 5.

The preferred sensor dropper 1 comprises three sub-assemblies, a support frame sub-assembly 15, a dropper mechanism sub-assembly 16, and a shield gate sub-assembly 28 shown in FIGS. 3, 5 and 6. The support frame sub-assembly is a structural weldment that includes a horizontal beam 17 that supports the dropper mechanism sub-assembly 16, a pair of spaced apart vertical beams 18 and 19 attached to opposite ends of the horizontal beam 17, a triangular framework that includes diagonal members 20 and 21 and a horizontal member 22 attached to the vertical beam 18, and diagonal bracing 23 and 24 that extends between the vertical beams 18 and 19. The one end of vertical beam 18 is attached to horizontal member 17, and the diagonal members 20 and 21 extend downward from beam 18 to opposite end portions of the horizontal member 22 to form the triangular frame.

Wheel assemblies 25a and 25b are attached to opposite ends of the horizontal member 22, and a wheel assembly 26 is attached to the end of vertical beam 19 opposite horizontal beam 17. This arrangement provides a three wheeled support frame 15 that is manually pushed or pulled to move the sensor dropper 1 toward or away from the weigh hopper opening. Guide rail 12 is sized to receive and direct wheel 26 safely across the weigh hopper opening while the back two wheels 25a and 25b follow along behind on the weigh hopper floor level 27 until they contact stop angle 14. Stop angle 14 is positioned to properly align the sensor dropper 1 over the weigh hopper opening.

Shown more clearly in FIGS. 3 and 5–7, the shield gate sub-assembly 28 comprises a frame 29 made up of angles 30 and a center channel member 31. The angles are fastened by welding or other suitable means to the channel members 10 of the weigh hopper 2, and the center channel member 31 divides frame 29 into two openings 29a and 29b. A cover plate 32 extends across the frame 29 to form a closure over the weigh hopper opening, and cover plate 32 includes openings 32a and 32b that correspond with the openings 29a and 29b in the frame to provide access to the drop path into the mouth of the BOF vessel when the sensor dropper is positioned above the weigh hopper.

Hinged shield gates 34 are attached to the frame 29 below each opening 32a and 32b. These hinged gates shield the sensor dropper from fume and flame that erupts into the weigh hopper 2 from the BOF vessel during blowing operations; particularly when gate 2, shown in FIG. 1, is in its open position. Each shield gate comprises a trough 35 having a closed end 36 attached to frame 29 adjacent its respective frame opening 29*a* or 29*b* by a hinge 37, and an open end 38 adjacent a hinged end cap 39 also attached to frame 29 by a hinge 40. Trough 35 comprises a "U" shaped section to provide a curved portion 41 positioned between opposed sidewalls 42. The trough includes a hinged closed end 36 and an open end 38 that provides an outlet for releasing and guiding dropped sensors toward the drop path. Each sidewall has an outward extending flange 43 that extends along the sidewall edge opposite the curved portion 41. Hinge 37 provides a means to pivot the trough 35 to an open position "B" or closed position "A" below its respective opening 33*a* or 33*b* in cover plate 32.

Trough 35, is proportioned to fill the space provided within its respective frame opening, either 29*a* or 29*b*, when the shield gate is in its closed position "A". This provides a barrier within the frame opening between the respective cover plate opening, either 33*a* or 33*b*, and the steelmaking operations that occur below at the BOF vessel. The end cap 39 extends downward from its hinge 40 and covers the open end 38 of trough 35, The hinged end cap 39 and trough 35 cooperate to provide a closed shield gates "A" below the cover plate openings 33*a* or 33*b* that shields the sensor dropper stored sensors from fume and flame that may surge upward along the sensor drop path during steelmaking operations.

Figure 15:
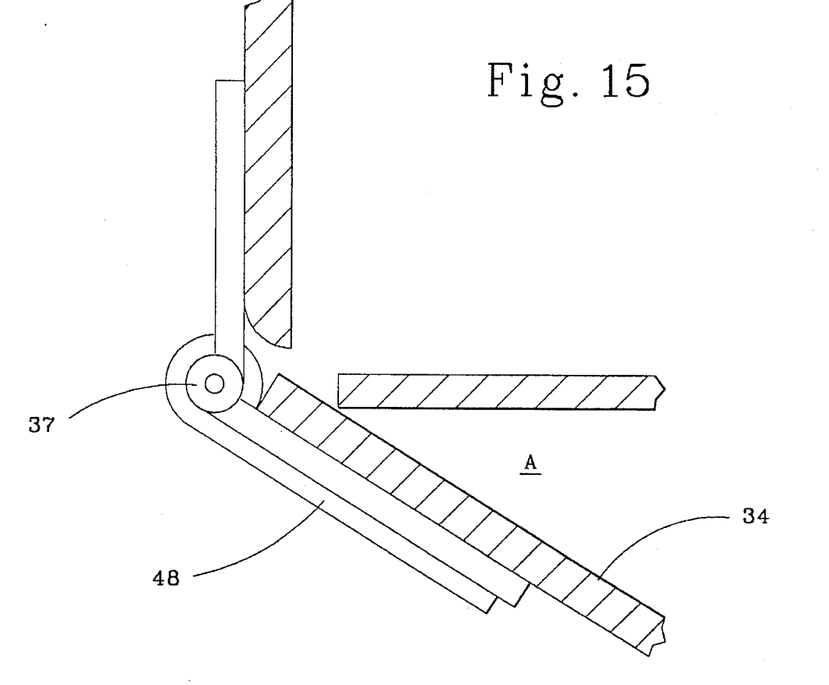
FIG. 15 is an enlarged detail showing an alternate embodiment for the shield gate bias means.
Figure 16:
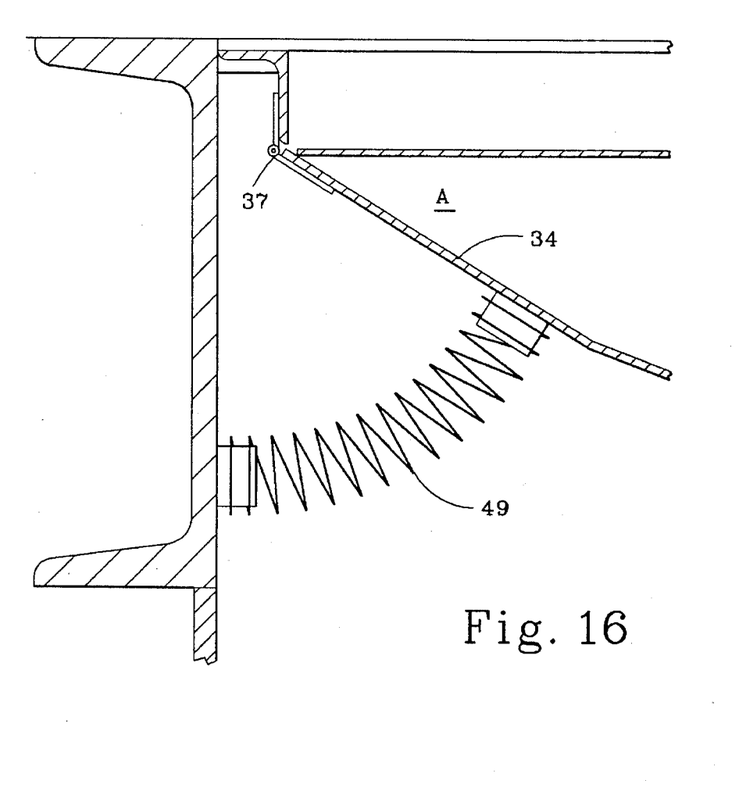
FIG. 16 is an enlarged detail showing a further alternate embodiment for the shield gate bias means.

Each hinged shield gate 34 includes a bias means to maintain the shield gate in the closed position "A". As shown in FIG. 3, the preferred embodiment bias means is shown comprising a counterweight 44 suspended from pulleys 45 and 46 by a cable 47 attached to the though 35 of the slide gate 34. The counterweight is balanced to allow trough 35 to pivot to its open position "B" when impacted upon by a dropped sensor released from the sensor dropper positioned above the drop path leading into the mouth of the BOF vessel. Although the preferred embodiment shows a counterweight bias means to maintain the shield gate in a closed position, it should be understood that other bias means may be used to maintain the shield gate in a closed position. For example, FIG. 15 shows a torsion spring mechanism 48 coupled to the hinge assembly 37 to provide a bias force that holds the hinged shield gate 34 in its closed position "A". The torsion spring mechanism is balanced to apply a closing force capable of being overcome to pivot the open position by the weight of a dropped sensor impacting upon the shield gate. Similarly, FIG. 16 shows a coil spring mechanism 49 used to bias the shield gate 34 in a closed direction "A". The force of the coil spring is also balanced to pivot to the open position when the shield gate is impacted upon by a dropped sensor.

It should also be understood that, although the hinged shield gates are shown being rotated by simple bias means, they could be just as well be rotated by a more complex motor drive arrangement without departing from the scope of this invention. For example, the hinged shield gates could be attached to linkage extending from a shield gate motor that holds the shield gates in their closed position and automatically rotates them to their open position when switch 70 is closed to start a selected dropper motor. The shield gate motor could then automatically rotate the shield gates back to their closed position after a preset time period.

As shown in FIG. 3, when a sensor 51 is released from the sensor dropper 1, it impacts upon the trough 35 of the shield gate as shown at 50. The mass and velocity of the falling sensor overcomes the closing force of the bias means, and the falling sensor causes the shield gate to pivot to its open position "B". The curved portion of trough 35 directs the dropped sensor 51 toward the flux chute and the sensor follows the drop path into the mouth of the BOF vessel. As the sensor fills through the open end 38 of trough 35, its weight causes the hinged end cap 39 to pivot open as shown at "C", and the falling sensor 51 pushes the end cap aside as it falls from the open shield gate toward the BOF vessel.

Figure 2:
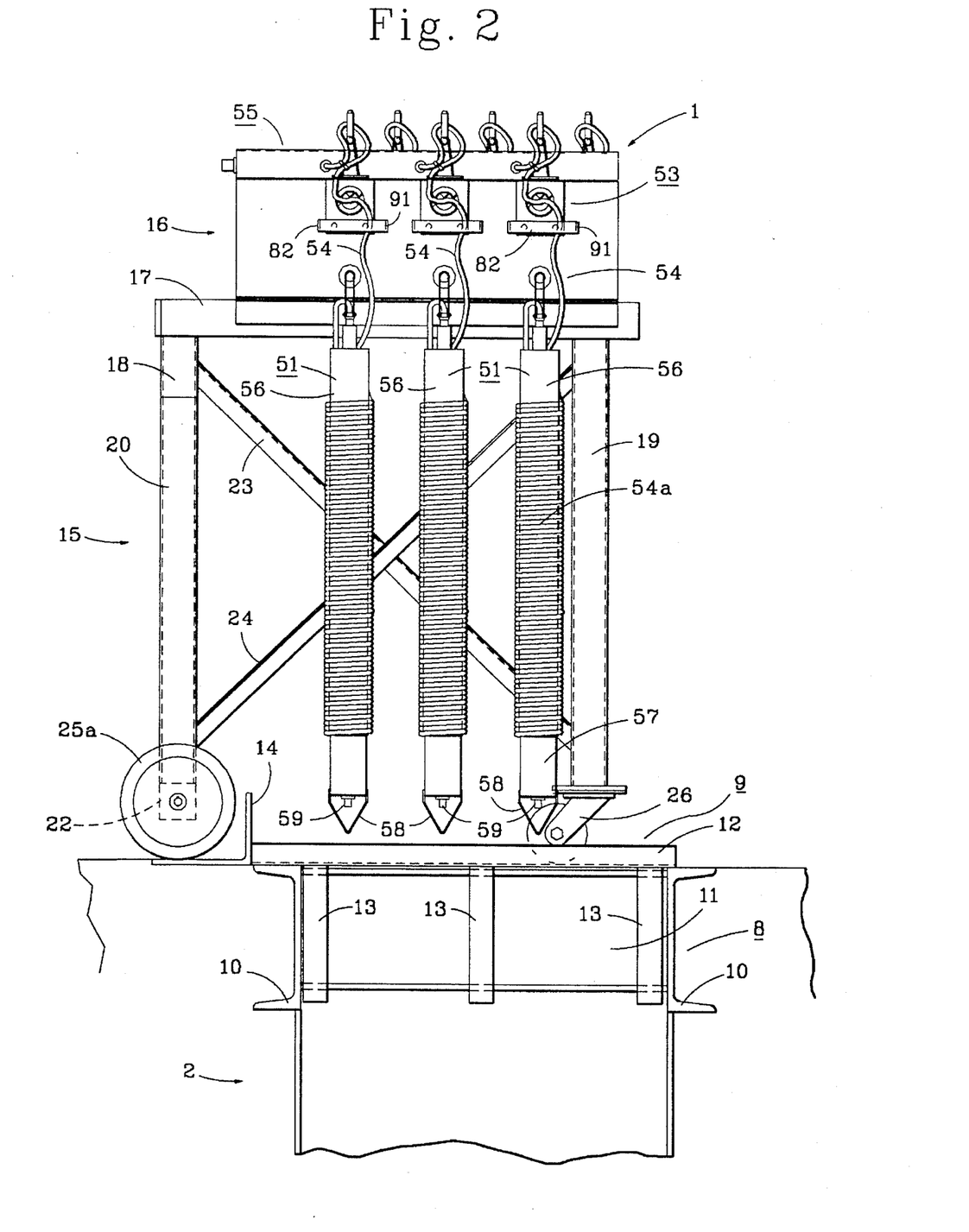
FIG. 2 is a fragmentary side elevation view showing the preferred sensor hopper positioned over a BOF weigh hopper.
Figure 4:
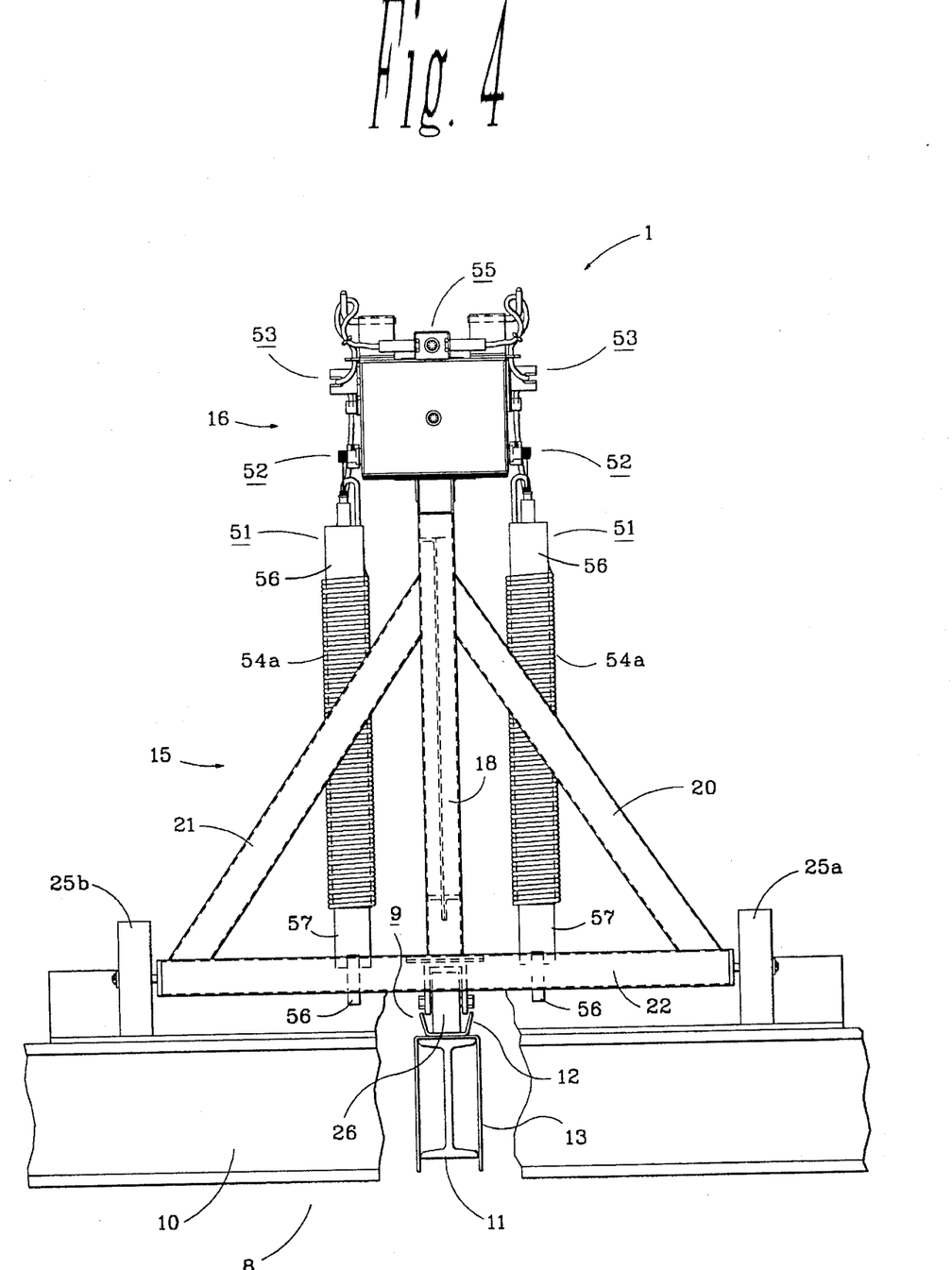
FIG. 4 is a fragmentary end view showing the preferred sensor dropper positioned over the BOF weigh hopper.

As shown in FIGS. 2 and 4, the dropper mechanism sub-assembly 16 includes a storage and release means 52 for storing and dropping a plurality of weighted sensors 51 on command from a remote control panel 7 shown in FIG. 1. The dropper mechanism sub-assembly also includes a shear means 53 to clear expended electrical cables 54 left behind from dropped sensors 51. The expended electrical cables are cleared from the sensor drop path before new sensors are released into the vessel.

The storage and release means 52 of dropper mechanism sub-assembly 16 provides a supply of weighted sensors 51 for dropping into the BOF, and includes a circuit box 55 for electrical connections between the sensors 51 and the control panel 7 normally located on the operating floor of the BOF shop. The shear mechanism 53 is attached to the dropper sub-assembly 16 at a location above the storage and release mechanism 52 to sever the expended electrical cables 54 that are left behind from dropped sensors.

The preferred embodiment includes weighted sensors 51 comprising an elongated tubular member 56 having a weighted end portion 57 to provide sufficient mass to penetrate through the slag cover and carry the sensor to a depth in the steel bath that will provide reliable temperature measurements. It should be understood, however, that although a particular sensor device is shown in the drawings, any suitable sensor device arrangement may be used with the present sensor dropper invention. In addition to the weighted tubular member 56, the preferred sensors also include a pointed shield 58 to facilitate penetration through the slag and into the steel bath, and also protects the sensitive thermocouple 59 during the journey down the weigh hopper gate and flux chute into the BOF vessel.

An electrical cable 54, having one end attached to the thermocouple 59, extends through tubular member 56 and is coiled along the outside length of tube 56. The electrical cable coils 54*a* are wound any suitable manner that will cause the coils to fall free from the tubular member 56 when the sensor is dropped into the BOF. As more clearly shown in FIG. 9, each electrical cable 54 extends from its top coil wrap 54*a* and up through its respective shear mechanism 53. The second end of the sensor cable 54 is electrically connected to the terminal block 60, housed within circuit box 55, by means of a connector 61. Terminal block 60 communicates with the control panel through an electrical cable 62 (FIG. 1), attached to connector 63 on the circuit box 55. Cable 62 provides an electrical signal to a temperature readout 62*a* on the control panel.

Figures 8, 11, 12:
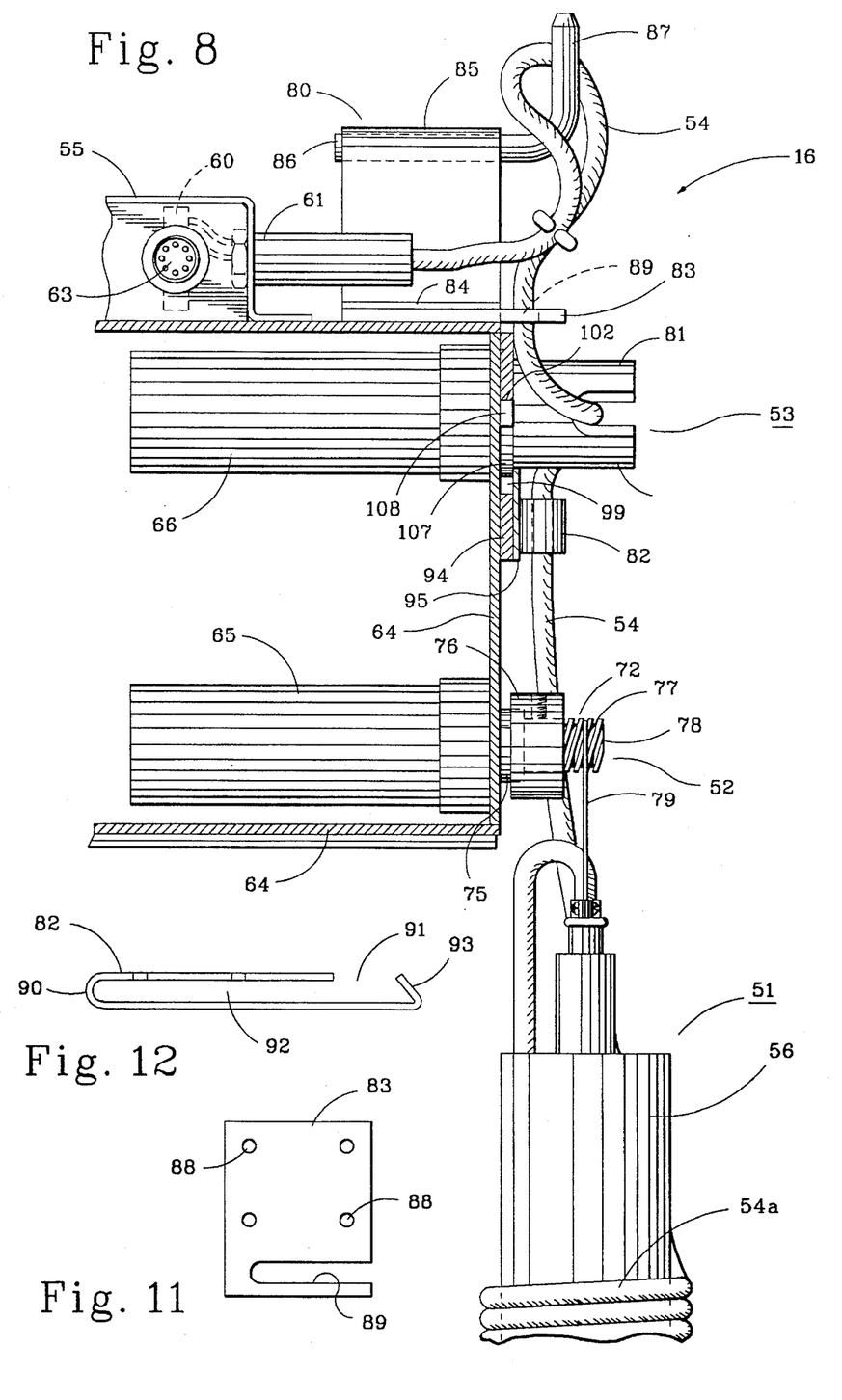
FIG. 8 is an enlarged cross-section view of the dropper portion of the sensor dropper.
FIG. 11 is a plan view of a cable clip.
FIG. 12 is a plan view of a cable clip.
Figure 9:
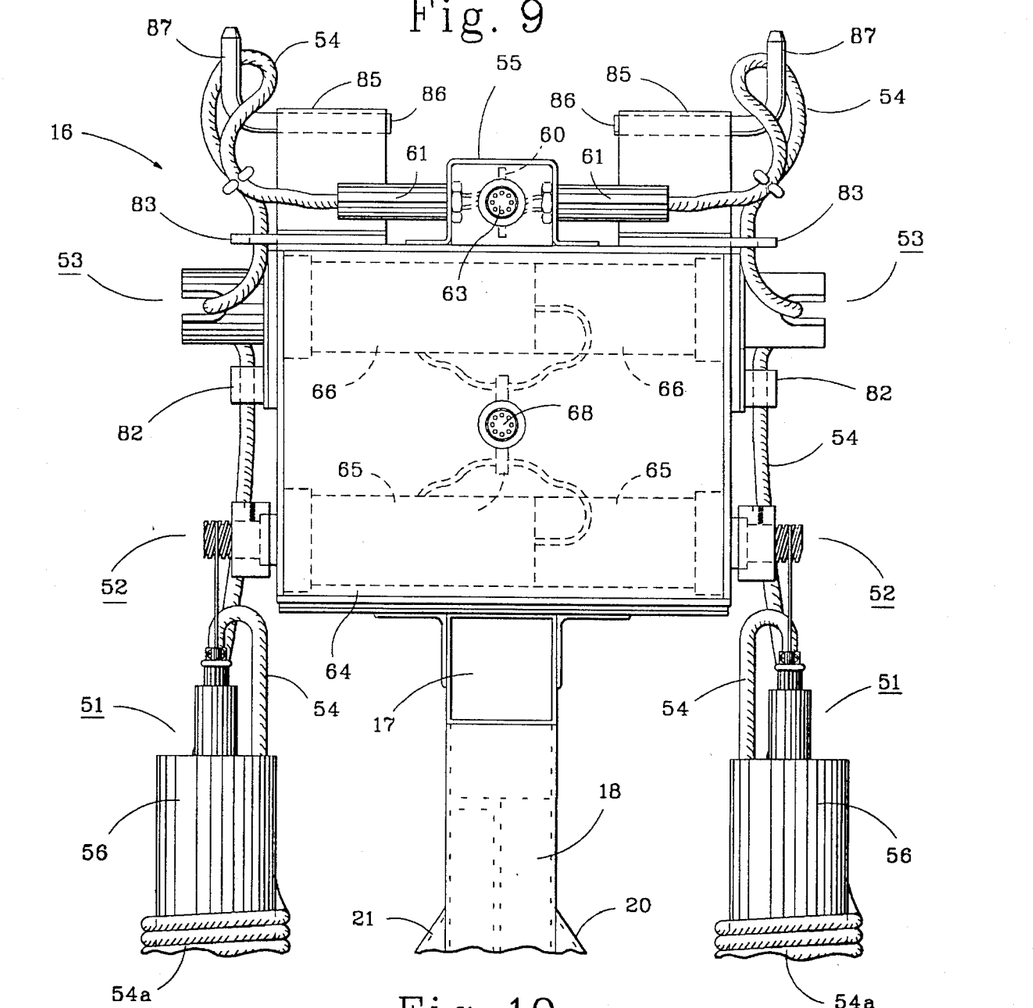
FIG. 9 is a end view of the dropper portion of the sensor dropper.

Referring now to FIGS. 8 and 9, the dropper mechanism sub-assembly 16 includes a closed box-like housing 64 in which dropper motors 65 that drive the storage and release mechanism 52, and shear motors 66 that drive the shear mechanisms 53 are housed. Each dropper motor 65 and each shear motor 66 is electrically connected to a second terminal block 67 attached to a connector 68 that communicates with the control panel 7 through an electrical cable 69 (FIG. 1). The dropper motor circuits are wired in any suitable manner that will permit an operator to selectively close any one switch 70 in a set of dropper motor switches and turn its corresponding dropper motor 65. The selected motor rotates a threaded shaft 72 and releases its stored sensor 51 when a temperature measurement is needed. Likewise, the shear motor circuits are also wired in any well known method that will automatically close any one switch 71 in a set of shear motor switches and activate its corresponding shear motor 66 at the appropriate time to drive its shear mechanism 53. This severs the expended electrical cable 54 that remains behind from a sensor drop before a new sensor is dropped into the vessel. As shown in FIG. 1, the control panel may also include dropper signal lights 73 and shear signal lights 74 to indicate the status of each storage and release mechanism 52 and each shear mechanism 53. Such status lights are helpful in indicating which sensors have been dropped into the vessel and which expended cables have been severed.

As shown in FIG. 8, each dropper motor 65 is mounted within housing 64 and a drive shaft 75 extends from motor 65 through a wall of housing 64. The drive shaft includes a shoulder portion 76 adjacent the outside surface of housing 64 and a threaded end portion 77 that extends a distance outward from shoulder 76 to provide a storage support having a free end 78 over which a hanger loop 79 from a sensor 51 is attached. It is desirable for the threaded portion 77 to have a thread pitch such that the spacing between the threads is wide enough to receive the hanger loop 79. The hanger loop is looped over the free end 78 of the drive shaft 75 to suspend the sensor in a stored position above the drop path, and the hanger loop 78 follows the lead of the screw toward the free end 78 when the threaded end portion 77 of the drive shaft 75 is rotated. Shoulder 76, positioned adjacent the outside surface of housing 64, provides a stop to prevent the electrical cable 54 from becoming entangled between the threads and housing when the drive shaft is rotated to drop its stored sensor 51.

When a temperature reading is needed, a switch 70 on the control panel, shown in FIG. 1, is closed to start a selected release mechanism 52. This turns on the dropper motor 65 of the selected release mechanism and rotates the threaded end portion 77 in a direction that will cause the sensor to walk off the free end 78 and fall into the drop path. When the stored sensor walks off the threaded end of the drive shaft, it falls through its respective opening, either 33a or 33b in the cover plate 32 and impacts upon the shield gate as shown at 50 in FIG. 3. The mass and velocity of the falling sensor overcomes the closing force of the bias means and causes the hinged shield gate to pivot to its open position. The sensor follows the downward pointing curved portion of the shield gate toward the drop path and falls into the BOF vessel below. As the weighted sensor 20 falls through the weigh hopper and into the flux chute 3 where it is directed into the mouth of the BOF, the biasing means returns the hinged shield gate to its closed position "A". In the preferred embodiment shown in FIG. 3, the counterweight 44 pulls the hinged shield gate 34 to its closed position "A" and the hinged end cap 39 returns to its closed position by gravity to cover the open end 38 of the shield gate.

Figure 10:
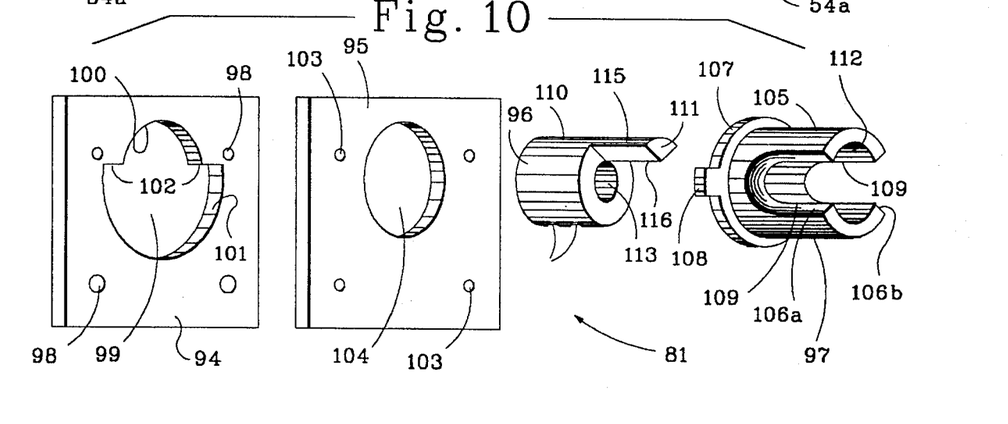
FIG. 10 is an exploded view of a shear mechanism attached to the sensor dropper.

Referring now to FIGS. 8 and 10, one end of the electrical cable 54 is attached to the thermocouple 59 shown in FIGS. 1 and 2 of the drawings. Cable 54 extends upward from the coil wrappings 54a that surround the stored weighted sensor 51, through the shear mechanism 53, and the second end of cable 54 includes a connector 61 that electrically connects cable 54 to the terminal block 60 housed within the circuit box 55.

The shear mechanism 53 comprises a cable support 80, and a rotating cutter assembly 81 positioned between a first cable clip 82 and a second cable clip 83. Cable support 80 includes a shaped plate having a base portion 84 and an upper portion 85 that encircles a cable hook 86 having an upstanding leg 87 around which electrical cable 54 is looped. The base portion 84 is attached to the second cable clip 83, and the cable support 80 and the second cable clip 83 are attached to housing 64 at a location above the rotating cutter assembly 81. As more clearly shown in FIG. 11, the second cable clip 83 comprises a flat plate having apertures 88 for receiving fasteners that attach the cable support 80 and second cable clip 83 to housing 64. One end portion of the second cable clip includes an elongated slot 89 that extends inward from one edge of the flat plate, and the elongated slot is sized to receive and hold the electrical cable 54 at a position above the rotating cutter assembly 81.

The first cable clip 82, shown in detail in FIG. 12, is attached to the shear mechanism 53 at a location below the rotating cutter assembly 81, and the first cable clip comprises a shaped strap having a closed end 90 and an open end 91. The strap is shaped to provide an elongated channel 92 for receiving and holding the electrical cable 54 at a position below rotating cutter assembly 81, and it further includes a hooked portion 93 to prevent the electrical cable 54 from accidently slipping free of the first cable clip 82. As shown in FIG. 2, the open end 91 of the first cable clip 82 extends past the edge of the shear mechanism to provide clearance for inserting the electrical cable 54 through opening 91 where it is threaded into the elongated channel portion 92 and held securely during a sensor drop.

As more clearly shown in the exploded view drawn in FIG. 10, the rotating cutter assembly 81 includes a first mounting plate 94, a second mounting plate 95, a cutter shaft 96, a tubular cutter 97, and the shear motor 66 shown mounted within housing 64 in FIGS. 8 and 9. The first mounting plate 94 includes mounting holes 98 for attaching the first mounting plate to the outside surface of housing 64, and a biarcuate aperture 99 shaped to receive the tubular cutter 97. The biarcuate aperture 99 extends through the first mounting plate and includes a first semicircle or arcuate portion 100, a second semicircle or arcuate portion 101 having a larger diameter than the first semicircular portion, and planar surfaces 102 that extend between the first and second semicircle portions of the biarcuate aperture.

The second mounting plate 95 includes mounting holes 103 that correspond with holes 98 in the first mounting plate 94, and a circular aperture 104. Circular aperture 104 extends through the second mounting plate 95 and is positioned to axially align with the biarcuate aperture 99 when the first and second mounting plates are fastened to housing 64 by screws or bolts inserted through the mounting holes 98 and 103 and threaded into the face of the shear motor 66.

The tubular cutter 97 includes a cylinder wall 105 having shearing slots 106a and 106b that extend inward from one end of cylinder wall 105, and a collar 107 at the end of the cylinder wall 105 opposite the shearing slots. Collar 107 has a larger diameter than the outside diameter of cylinder wall 105. The outside diameter of the cylinder wall 105 is proportioned to rotatably fit within the circular aperture 104 of the second mounting plate, and the diameter and thickness of the collar 107 is sized to rotatably fit within the first semicircular portion 100 of the biarcuate aperture 99 extending through the first mounting plate. Collar 107 includes a tab 108 that extends radially outward from the collar circumference, and the extended length of tab 108 is proportioned to fit within the larger circumference of the second semicircle portion 101 in the biarcuate aperture 99.

The spaced apart shearing slots 106a and 106b extend along opposite sides of cylinder wall 105, and each shearing slot includes a beveled surface to provide a cutter blade having a knife edge 109. The shearing slots 106a and 106b extend inward from one end of the cylinder wall to provide an open end for inserting the electrical sensor cables into the rotating cutter mechanism 81. In the preferred embodiment, the shearing slots are shown as elongated "U" shaped slots, the knife edge following the shape of the "U". However, these slots can be any suitable shape such as "V" shaped or square shaped without departing from the scope of this invention.

The cutter shaft 96 includes a cylinder portion 110 and a flying shear blade 111. The cylinder portion has an outside diameter sized to rotatably fit within the bore 112 that extends through the tubular cutter 97, and the cutter shaft 96 includes a bore 113 and set screws 114 for attaching the cutter shaft to the drive shaft of the shear motor 66. The flying shear blade 111 extends outward from the cutter shaft end opposite the shear motor 66 The shear blade includes an outside surface 115 that is concentric with bore 112 of tubular cutter 97, and a knife edge 116 positioned to cooperate with the knife edges of the shearing slots 106a and 106b. The flying shear blade capable of being rotated 360° or more within bore 112 of the cutting cylinder 97.

Referring again to FIG. 8 as well as FIG. 10, when assembled, the rotating cutter assembly 81, of each shear mechanism 53, is attached to the outside surface of housing 64 by fasteners 117 (FIGS. 9 and 10), that extend through the mounting holes 98 and 103 of the first and second mounting plates 94 and 95 shown in FIG. 10. The tubular cutter 97 extends through the circular aperture 104 of the second mounting plate 95 and its collar 107 is partially encircled within the first semicircular portion 100 of the biarcuate aperture 99, where the collar is rotatably captured between the second mounting plate 95 and the outside surface of housing 64. Tab 108 extends outward from the circumference of collar 107 and is captured within the space defined by the second semicircular portion 101 of the biarcuate aperture between the second mounting plate 95 and housing 64. Tab 108 is free to rotate within an arc defined by the second semicircular portion 101 until it engages one of the planar surfaces 102 of the biarcuate aperture 99. This provides a stop to limit the arc of rotation for the tubular cutter 97.

The cutter shaft 96 is attached to the drive shaft of shear motor 66 and is enclosed within the bore 112 that extends through the tubular cutter 97. The flying shear blade 111 is positioned to extend along the lengths of the opposed shear slots 106a and 106b. This interlocking arrangement between the cutter shaft and tubular cutter provides one or more outer cutter blades, each outer cutter blade having a knife edge 109 capable of being rotated in an arc of less than 360°, and an inner cutter blade having a knife edge 116 capable of being rotated in an arch of 360° or more to operate as a flying shear within bore 112 adjacent the knife edges 109.

Figure 7:
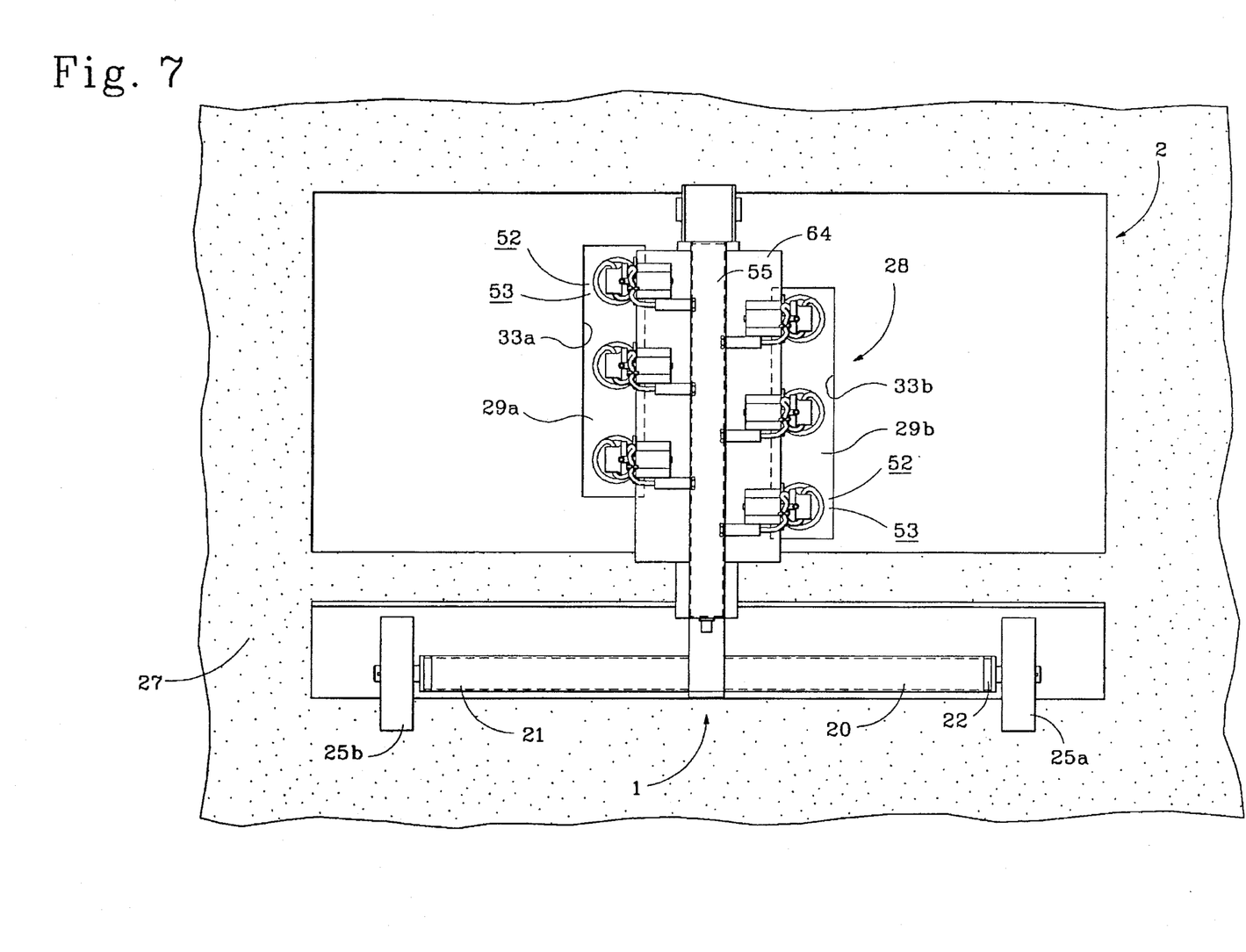
FIG. 7 is a plan view showing the preferred sensor dropper positioned over the BOF weigh hopper.

As shown in FIG. 7, a plurality of storage and release mechanisms 52 and shear mechanisms 53 may be attached to opposite sides of housing 64. In the preferred embodiment, the mechanisms have been off-set on opposite sides of the housing 64 to provide clearance for the dropper motors 65 and shear motors 66 inside the housing.

Figure 13:
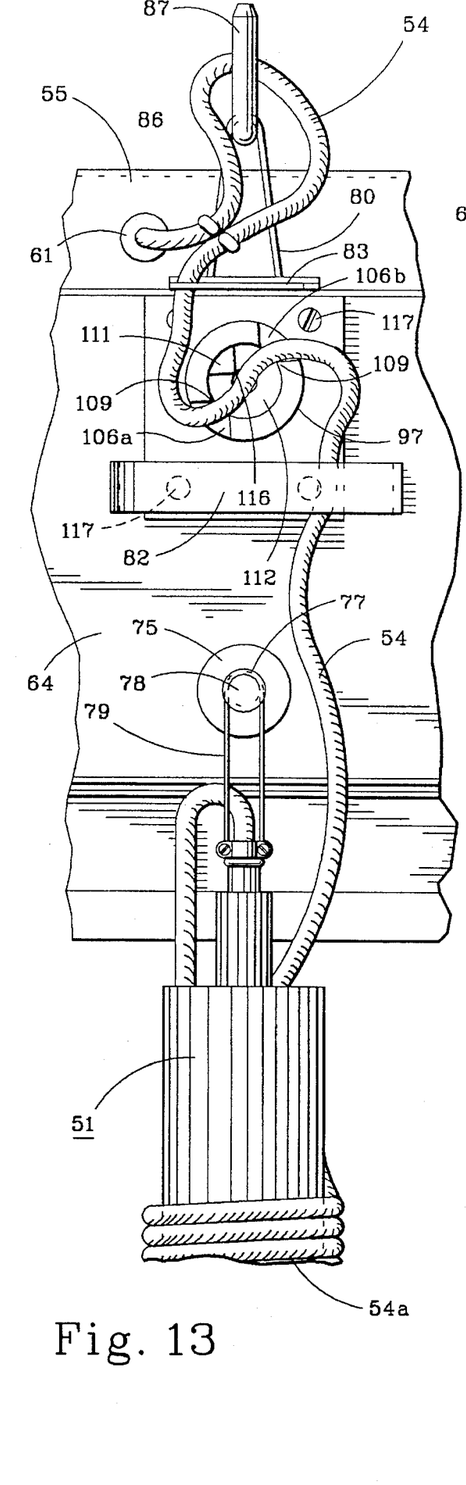
FIG. 13 is an enlarged view showing the sensor cable threaded through the shear mechanism.
Figure 14:
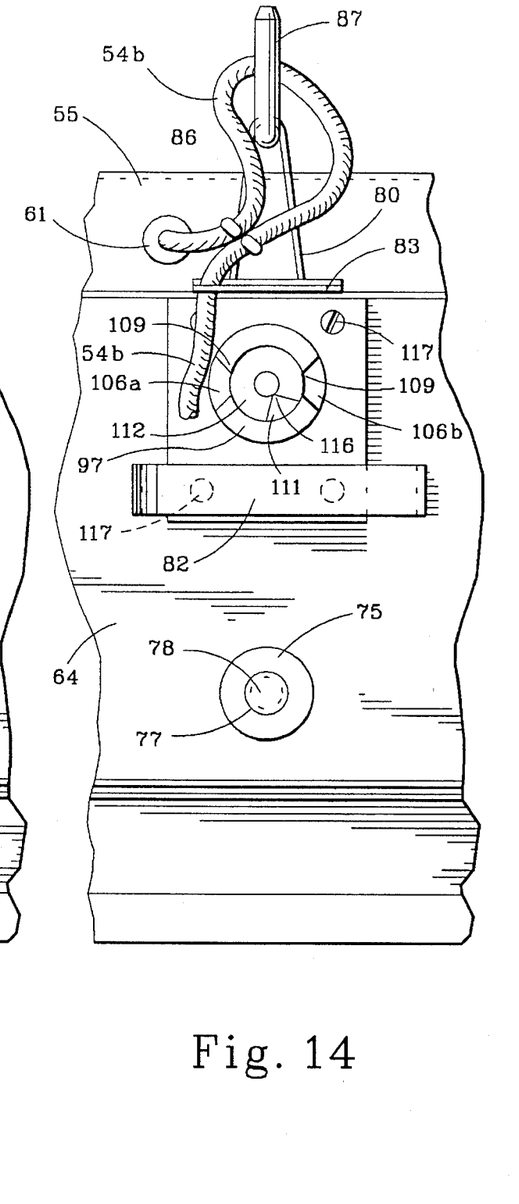
FIG. 14 is a view similar to FIG. 13 showing a severed sensor cable.

Referring again to FIG. 8 as well as FIGS. 13 and 14, during steelmaking operations weighted sensors 51 are suspended from the threaded end portion 77 of the drive shaft 75 by means of a hanger loop 79. Each electrical sensor cable 54, that extends from its stored sensor 51, is threaded through the first cable clip 82, between the outer knife edges 109 of the shearing slots extending along the tubular cutter 97 and across the knife edge 116 of the flying shear blade 111, through the second cable clip 83, and the cable is finally looped around the upstanding leg 87 of the hook 86 extending from the cable support 80.

As heretofore described, the tubular cutter is free to rotate within an arch of less than 360°. This enables the operator to freely rotate the tubular cutter 97 during the threading operations, thereby facilitating threading of the stiff cable through the various clips and shear blades of the sensor dropper mechanisms. In particular, the free rotation of the tubular cutter greatly helps threading the electrical cable 54 through the opposed shear slots 106a and 106b and across the knife edge 116 of the flying shear blade 111 which may be resting at any angled position within bore 112.

As described above, when a temperature reading is required, a switch 70 is thrown on the control panel to activate a selected dropper motor 65. This rotates the threaded shaft 72 in a direction that will cause the sensor hanger loop 79 to follow the inclined plane of the threaded shaft toward its free end 78. The sensor hanger loop walks off the free end 78 of the rotating threaded shaft, and drops through the shied gate mechanism 28. The weight of the sensor offsets the force of the counterweight 44 and rotates the hinged shield gate 34 to its open position, and the sensor slides down the flux chute 3 to free fall into the BOF vessel shown in FIG. 1. As the weighted sensor falls into the BOF, the first and second cable clips 82 and 83 prevent the electrical cable from being pulled loose from the shear mechanism 53, and the cable support 80 holds one end of the electrical cable fast to pull the cable coils 54a free from the falling sensor.

The weighted sensor 51 penetrates the slag cover and is immersed within the steel bath contained in the BOF vessel, where it is quickly consumed after temperature readings are recorded on the temperature readout 62a (FIG. 1). However, only part of the electrical cable 54 is consumed by the intense heat emitted from the BOF. As illustrated in FIG. 1, the remaining expended cable portion 54b extends from the sensor dropper 1, down through the weigh hopper 2 and flux chute 3, and dangles loosely above the mouth of the BOF vessel. Such dangling left over cables restrict the free fall path of following sensors, and they may cause following sensors to enter the vessel at a reduced speed or at skewed angles that reduce sensor penetration into the metal bath and produce faulty temperature readings. Because of this potential problem, the expended cables should be cleared from the drop path.

To clear the drop path of left over cables for following sensor drops, a switch 71 is automatically thrown on the control panel shown in FIG. 1 after the temperature measurement is completed. This turns on a selected shear motor 66 and rotates the flying shear blade 111 within bore 112 of the tubular cutter 97. If the tubular cutter has been rotated for the sensor cable threading operation as shown in FIG. 13, the tubular cutter and flying shear blade rotate together until tab 108 engages one of the planar surfaces 102 of the biarcuate aperture 99 as shown in FIG. 8. This causes the rotation of the tubular cutter 97 and its outer shear blades 106a and 106b to stop. However, the inner flying shear blade 111 continues to rotate within bore 112, and it severs the expended electrical cable 54 between the stationary outer knife edges 109 of the tubular cutter and the rotating knife edge 116 of the flying shear.

While this invention has been described as having a preferred apparatus for dropping sensors into a BOF vessel and clearing expended electrical cables from the drop path, it is understood that it is capable of further modifications, uses, and/or adaptations following in general the principle of the invention and including such departures from the present disclosure as come within known or customary practice in the art to which the invention pertains, and as may be applied to the essential features set forth herein, that fall within the scope of the appended claims.

I claim:

1. A sensor dropper for storing and dropping sensors into a BOF (Basic Oxygen Furnace) vessel, comprising;
   a) a support frame having a means to move said sensor dropper toward or away from a sensor drop path into said BOF vessel; and
   b) a dropper assembly having a housing supported by said moveable support frame including;
      i) at least one storage and release mechanism having a sensor support shaft extending from said housing to hold a sensor in a stored position above said sensor drop path, said sensor support shaft having a free end opposite a drive end for rotating said sensor support shaft in a direction to cause said sensor to drop off said free end, and
      ii) at least one shear mechanism to receive and sever an electrical cable extending from said sensor, said shear mechanism including a cutter assembly extending from said housing and including outer shear blades and an inner shear blade spaced to receive and sever said electrical cable.

2. The sensor dropper of claim 1 wherein said support frame includes;
   a) at least three wheels attached to said support frame to provide means for moving said sensor dropper toward or away from said sensor drop path;
   b) a guide rail extending across an opening above said sensor drop path, said guide rail shaped to receive and guide at least one wheel across said opening to position said sensor dropper above said sensor drop path into said BOF vessel, and
   c) a stop attached to said guide rail to limit movement of said sensor dropper toward or away from said sensor drop path.

3. The sensor dropper of claim 1 wherein said sensor support shaft of said at least one storage and release mechanism includes;
   a) a threaded portion for receiving and suspending said sensor in said stored position above said sensor dropper path, said threaded portion having threads extending to said free end of said sensor support shaft, and
   b) a motor attached to said drive end of said sensor support shaft to rotate said sensor support shaft in a direction to cause said sensor to follow said threads toward said free end until said sensor drops off said free end.

4. The sensor dropper of claim 3 wherein said threads have a pitch to receive a hanger loop extending from said sensor suspended from said sensor support shaft.

5. The sensor dropper of claim 1 wherein said cutter assembly extending from said housing includes;
   a) a tubular cutter having,
      i) a cylinder wall including a cutter end positioned outward from said sensor dropper housing and a collar opposite said cutter end, and
      ii) shear slots extending inward from said cutter end to a position along said cylinder wall, each shear slot having a knife edge; and
   b) a cutter shaft rotatably enclosed within said tubular cutter and including;
      i) a shear blade extending outward from said cutter shaft and positioned to correspond with said shear slots extending along said cylinder wall, said shear blade having a knife edge, and
      ii) a drive end attached to a motor to rotate said shear blade within said tubular cutter to cause said knife edge of said shear blade to move past the knife edges of said shear slots.

6. The sensor dropper of claim 5 wherein said cutter assembly extending from said housing includes;
   a) a first mounting plate adjacent said housing and including;
      i) a biarcuate aperture to rotatably receive said collar of said tubular cutter, said biarcuate aperture having a first arcuate portion and a second arcuate portion, said second arcuate portion having a larger diameter than said first arcuate portion, and
      ii) a stop surface extending between said first arcuate portion and said second arcuate portion; and
   b) a second mounting plate adjacent said first mounting plate, said second mounting plate having an aperture to rotatably receive said cylinder wall of the tubular cutter, said aperture axially aligned with said biarcuate aperture.

7. The sensor dropper of claim 6 wherein said collar is rotatably captured within said biarcuate aperture between said housing and said second mounting plate, and said cylinder wall of the tubular cutter extends outward through said aperture of said second mounting plate, said tubular cutter including;
   a) an outside surface concentric with the first arcuate portion of said biarcuate aperture, and
   b) a tab extending outward from said outside surface into the second arcuate portion of said biarcuate aperture, said tab engaging said stop surface to limit rotation of said tubular cutter.

8. The sensor dropper of claim 5 wherein said tubular cutter includes two opposed shear slots.

9. A sensor dropper for storing, shielding and dropping sensors into a BOF (Basic Oxygen Furnace) vessel, comprising;
   a) a support frame having a means to move said sensor dropper toward or away from a sensor drop path into said BOF vessel;
   b) a dropper assembly having a housing supported by said moveable support frame including;
      i) at least one storage and release mechanism having a sensor support shaft extending from said housing to hold a sensor in a stored position above said sensor drop path, said sensor support shaft having a free end opposite a drive end for rotating said sensor support shaft in a direction to cause said sensor to drop off said free end, and
      ii) at least one shear mechanism to receive and sever an electrical cable extending from said sensor, said shear mechanism including a cutter assembly extending from said housing and including outer shear blades and an inner shear blade spaced to receive and sever said electrical cable; and
   c) at least one movable shield gate positioned along said sensor drop path between said dropper assembly and said BOF vessel.

10. The sensor dropper of claim 9 wherein said support frame includes;
    a) at least three wheels attached to said support frame to provide means for moving said sensor dropper toward or away from said sensor drop path;

b) a guide rail extending across an opening above said sensor drop path, said guide rail shaped to receive and guide at least one wheel across said opening to position said sensor dropper above said sensor drop path into said BOF vessel, and c) a stop attached to said guide rail to limit movement of said sensor dropper toward or away from said sensor drop path.

11. The sensor dropper of claim 9 wherein said sensor support shaft of said at least one storage and release mechanism includes;

a) a threaded portion for receiving and suspending said sensor in a stored position above said sensor drop path, said threaded portion having threads extending to said free end of said sensor support shaft, and b) a motor attached to said drive end of said sensor support shaft to rotate said sensor support shaft in a direction to cause said sensor to follow said threads toward said free end until said sensor drops off said free end.

12. The sensor dropper of claim 11 wherein said threads have a pitch to receive a hanger loop extending from said sensor suspended from on said sensor support shaft.

13. The sensor dropper of claim 9 wherein said cutter assembly extending from said housing includes;

a) a tubular cutter having,
i) a cylinder wall including a cutter end positioned outward from said sensor dropper housing and a collar opposite said cutter end,
ii) shear slots extending inward from said cutter end to a position along said cylinder wall, each said shear slot having a knife edge; and b) a cutter shaft rotatably enclosed within said tubular cutter and including;
i) a shear blade extending outward from said cutter shaft and positioned to correspond with said shear slots along said cylinder wall, said shear blade having a knife edge, and
ii) a drive end attached to a motor to rotate said shear blade within said tubular cutter to cause said knife edge of said shear blade to move past the knife edges of said shear slots.

14. The sensor dropper of claim 13 wherein said cutter assembly extending from said housing includes;

a) a first mounting plate adjacent said housing and including;
i) a biarcuate aperture to rotatably receive said collar of said tubular cutter, said biarcuate aperture having a first arcuate portion and a second arcuate portion, said second arcuate portion having a larger diameter than said first arcuate portion, and
ii) a stop surface extending between said first arcuate portion and said second arcuate portion; and b) a second mounting plate adjacent said first mounting plate, said second mounting plate having an aperture to rotatably receive said cylinder wall of the tubular cutter, said aperture axially aligned with said biarcuate aperture.

15. The sensor dropper of claim 14 wherein said collar is rotatably captured within said biarcuate aperture between said housing and said second mounting plate, and said cylinder wall of the tubular cutter extends outward through said aperture of said second mounting plate, said tubular cutter including;

a) an outside surface concentric with the first arcuate portion of said biarcuate aperture, and b) a tab extending outward from said outside surface into the second arcuate portion of said biarcuate aperture, said tab engaging said stop surface to limit rotation of said tubular cutter.

16. The sensor dropper of claim 13 wherein said tubular cutter includes two opposed shear slots.

17. The sensor dropper of claim 9 wherein said at least one moveable shield gate includes a bias means, said bias means balanced to;

a) automatically rotate said at least one moveable shield gate to an open position upon impact from a dropped a sensor, and b) automatically rotate said at least one moveable shield gate to said closed position after said impact from said dropped sensor.

18. The sensor dropper of claim 17 wherein said bias means is a counterweight.

19. The sensor dropper of claim 17 wherein said bias means is a spring.

20. The sensor dropper of claim 9 wherein said at least one moveable shield gate includes;

a) a trough having a closed hinged end and a curved surface extending toward an open end that provides an outlet for guiding dropped sensors toward said sensor drop path, said trough rotatable to a closed position to shield said dropper assembly from said BOF vessel, and said trough rotatable to an open position to release said dropped sensors from said outlet, b) a hinged end cap positioned adjacent said outlet of said hinged trough, said hinged end cap rotatable toward said open end to provide a closure when said trough is in said closed position, said end cap rotatable away from said outlet to provide access to said sensor drop path when said trough is in said open position, and c) a bias means to hold said trough in said closed position to shield said dropper assembly from said BOF vessel, said bias means balanced to allow said trough to rotate to said open position upon impact from a dropped sensor and return to said closed position when said dropped sensor is released from said outlet into said sensor drop path.

21. The sensor dropper of claim 20 wherein said bias means is a counterweight.

22. The sensor dropper of claim 20 wherein said bias means is a spring.

23. A sensor dropper for storing and dropping sensors into a BOF (Basic Oxygen Furnace) vessel, comprising;

a) a support frame to move the sensor dropper toward or away from a sensor drop path leading into said BOF vessel;

b) a dropper assembly supported on said support frame for storing and releasing sensors into said sensor drop path leading into said BOF vessel, said dropper assembly including a plurality of storage and release mechanisms and corresponding shear mechanisms, each storage and release mechanism having a threaded sensor support shaft from which a stored sensor is suspended and dropped into said sensor drop path leading into said BOF vessel when the threads of said threaded sensor support shaft are rotated in an outward direction, each shear mechanism including an inner shear blade housed within a tubular cutter having outer shear blades said inner shear blade positioned within said tubular cutter to sever an electrical sensor cable when said inner shear blade is rotated past said outer shear blades of said tubular cutter.

24. The sensor dropper of claim 23 further including;

a) at least one moveable shield gate position along said sensor drop path between said dropper assembly and said BOF vessel.

* * * * *